United States Patent

[11] 3,611,093

| [72] | Inventor | Alec H. B. Walker<br>Trafford, Pa. |
|---|---|---|
| [21] | Appl. No. | 22,581 |
| [22] | Filed | Mar. 25, 1970 |
| [45] | Patented | Oct. 5, 1971 |
| [73] | Assignee | Westinghouse Electric Corporation<br>Pittsburgh, Pa. |

[54] HIGH-SPEED CURRENT REVERSAL SYSTEM
8 Claims, 2 Drawing Figs.

[52] U.S. Cl. .................................................. 318/258,
318/293, 318/300
[51] Int. Cl. .................................................. H02p 5/00
[50] Field of Search.......................................... 318/257,
258, 296, 293, 300

[56] References Cited
UNITED STATES PATENTS

| 3,146,390 | 8/1964 | Wolff | 318/293 |
| 3,184,670 | 5/1965 | Reynolds | 318/300 |
| 3,302,089 | 1/1967 | Rosa et al. | 318/300 |
| 3,418,560 | 12/1968 | Peterson | 318/300 |

*Primary Examiner*—Oris L. Rader
*Assistant Examiner*—K. L. Crosson
*Attorneys*—F. H. Henson, C. F. Renz and A. S. Oddi ABSTRACT: A high-speed current reversal system and method wherein the current through an impedance element including inductance, such as the field winding of a DC motor, may be rapidly reversed as compared to the normal reversal time required by reversing the polarities of the power supply, the rapid reversal being effected by open circuiting the impedance element in the direction of current flow, establishing a resonant oscillation at a predetermined resonant frequency, for example, so that the half period at the resonant frequency is equal to the desired rapid reversal time, translating the current in the reverse direction back to the source when it reaches a predetermined magnitude, reversing the polarity of the power supply to sustain the reverse direction of current flow and reclosing the open circuit prior to the time of the next current reversal.

WITNESSES
Bernard R. Gieguey
James T. Young

INVENTOR
Alec H. B. Walker
BY
ATTORNEY

HIGH-SPEED CURRENT REVERSAL SYSTEM

BACKGROUND OF THE INVENTION

1. Field of the Invention

The present invention relates to current reversal systems and methods wherein the reversal is effected in a very short period of time and more particularly to such systems and method wherein a forced method of reversal is not employed.

2. Description of the Prior Art

It is a common practice to reverse the direction of current applied to the field winding of a direct current motor in order to reverse the direction of operation of the motor. Due to the relatively high inductance of the field winding and the energy stored therein, a relatively long period of time is required to reverse the direction of current if this reversal is to take place by the straightforward technique of reversing the polarity of the DC power supply for the field winding. In order to shorten the time required to reverse the field current, force reversal techniques have been employed in the prior art. Typically, this entails utilizing a high-voltage power supply to force the reversal of the field current and once the reversal had been completed to revert to the normal lower voltage of the reversed polarity. The requirement for such a high-voltage power supply for rapid reversal of the field current greatly increases the cost of the system with the high-voltage power supply becoming an appreciable percentage of the total cost. The present invention provides a rapid current reversal system and method without necessitating the use of an expensive high-voltage power supply for force reversing the current through an inductive element.

SUMMARY OF THE INVENTION N

Broadly, the present invention provides a system and method for rapidly reversing the current through an impedance element not requiring the use of an expensive high-voltage power supply wherein, when the rapid reversal is desired, the current is interrupted so that a resonant oscillation is established with the inductive element so that the current reverses and reaches a predetermined magnitude in a predetermined time period to flow in the reverse direction back to the source, the polarity of the source being reversed to sustain the reversed direction of current flow and the circuit path being reestablished to the inductive element prior to the time at which current reversal is again desired.

DESCRIPTION OF THE PREFERRED EMBODIMENT

Figure 1:
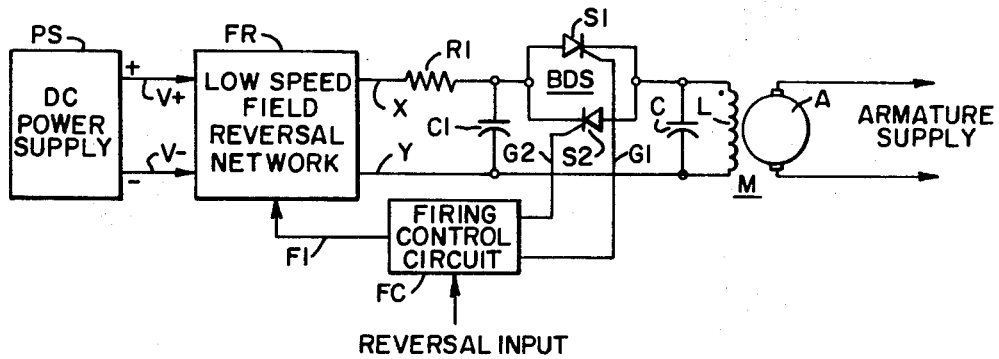
FIG. 1 is a schematic block diagram of the current reversing system of the present invention and wherein the method of the present invention may be employed.

Referring now to FIG. 1, the system as shown is for effecting the rapid reversal of the field current supplied to a field winding L of a direct current motor M. The motor M includes an armature A which is separately supplied with direct current from an armature supply. To effect reversal of the direction of rotation of the motor M, the direction of the current through the field winding L is brought about via the field reversal system now to be described.

A DC power supply PS provides positive and negative outputs V+ and V−, respectively. The power supply PS may be a standard low-voltage power supply typically utilized for supplying the field winding of a DC motor. The V+ and V− outputs are supplied to a low-speed feed reversal network FR. The outputs X and Y of opposite polarities are provided by the low-speed feed field reversal network FR. It is the function of the low-speed field reversal network FR to supply the V+ output of the DC power supply PS to the X line or the Y line and, vice versa, to supply the V− output to the Y line or the X line, respectively. The low-speed field reversal network FR may comprise any well-known low-speed switching network such as comprising mechanical, electromechanical or solid state switching elements which permits the V+ and V− outputs of the power supply PS to be translated directly through or selectively to be switched to the opposite output lines. An input F1 is applied to the low-speed field reversal network FR in order to effect the changeover of polarities between the lines X and Y. If solid state controlled switching devices, such as thyristors are utilized, in the field reversal network FR the input F1 may be supplied by a firing control circuit FC as shown in FIG. 1. Accordingly, the polarity at the output lines X and Y is reversed in response to an F1 reversal input thereto which may comprise merely the opening and closing of mechanical switches or the application of gating pulses to controlled switching devices to change their conductive state.

A filter network including a resistor R1 and a capacitor C1 is connected across the X and Y lines. The junction point of the resistor R1 and the capacitor C1 is connected to one end of a bidirectional switch BDS. The bidirectional switch BDS includes a first unidirectional switching device S1 and a second unidirectional switching device S2. The unidirectional switching devices S1 and S2 are connected in an antiparallel arrangement wherein their unidirectional conductive direction is opposite to one another. The devices S1 and S2 as utilized in the system of FIG. 1 may comprise, for example, controlled switching devices having a turnoff characteristic, such as, thyristors having a gate turnoff characteristic or power to transistors which may be turned off by controlling the base input thereto. Additionally, mechanical or electromechanical switches may be utilized if suitably poled diodes or rectifier devices are connected in series therewith so that separate conductive paths are provided in the respective current directions. For the purpose of simplicity of explanation the unidirectional switching devices S1 and S2 have been shown as gate controlled switching devices having a gate turnoff characteristic. Either device S1 or S2 being of the turnoff type may be turned off by the application of a negative polarity voltage to the gate electrode thereof with respect to the cathode electrode. Such turnoff controlled switching devices, such as thyristor having a gate turnoff characteristic, are readily available on the market and have relatively high current turnoff characteristics. If necessary, a number of thyristors having gate turnoff characteristics may be connected in series in each direction of the bidirectional switch BDS depending upon the current carrying requirements for the field winding L.

The field winding L of the motor M is connected in series with the bidirectional switch BDS at the end opposite to the DC power supply PS. The firing control circuit FC supplies either turn on or turnoff voltages to the gate electrodes G1 and G2 of the switching devices S1 and S2 respectively. In steady-state operation a positive polarity turn on voltage is maintained on the gate electrodes of each of the devices S1 and S2 so that each is placed in a conductive state and will translate current from the anode electrode to the cathode electrode thereof when the anode of the r device is at a positive polarity with respect to the cathode. Accordingly, if the line X, the output of the low-speed field reversal network FR is positive with respect to the output line Y, current will be translated via the line X the resistor R1, the anode-cathode circuit of the switching device S1 into the dotted end of the field winding L and therethrough to the negative line Y. This will establish, for example, the forward direction of rotation for the motor M. Conversely, if the line Y is made positive with respect to the line X, current will be supplied through the field winding L in the reverse direction from the line Y, into the undotted end of the field winding L and therethrough, through the anode-cathode circuit of the controlled switch S2, the resistor R1 to the line X which is now negative. The reverse direction of current flow through the field winding L establishes the reverse direction of motor operation for the motor M.

As previously discussed the switching devices S1 and S2 are of the turnoff type so that when current is flowing through device it may be open circuited by the application of a negative polarity voltage to the gate electrode thereof making the gate negative with respect to the cathode electrode, the turnoff may be effected as long as the current flowing in the anode-cathode circuit of the device is within its current turnoff capability. A capacitor C is connected directly across the field winding L but does not effect the operation of the circuit when it is in steady-state operation with current flowing in the forward or reverse direction through the field winding L. The capacitor C comes into play when it is desired to rapidly reverse the direction of current through the field winding L from either the forward to the reverse direction or vice versa.

Figure 2:
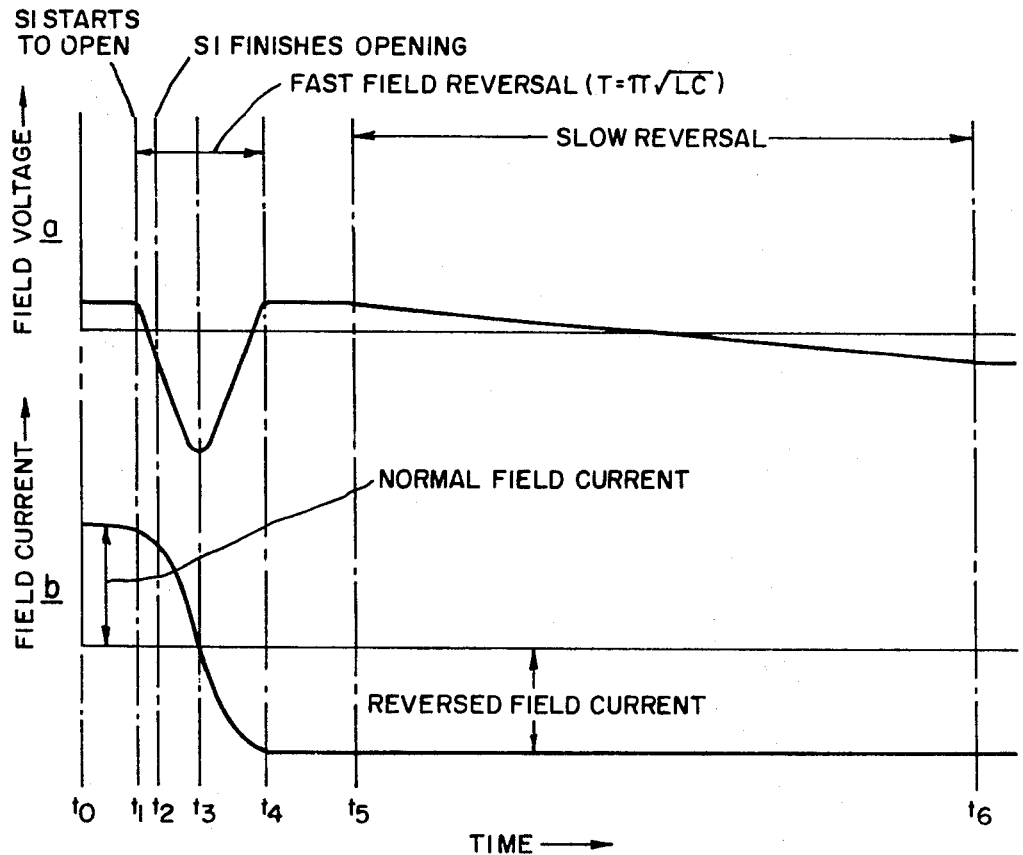
FIG. 2 includes curve a which is a plot of the field voltage as a function of time and curve b which is a plot of field current as a function of time, for the field winding as shown in FIG. 1.

Referring now also to FIG. 2 the fast reversal operation of the present invention will be described. Curve $a$ of FIG. 2 is a plot of the voltage across the field winding L as a function of time. Curve $b$ is a plot of the current through the field winding L as a function of time. At a time to assume that the system is in a steady-state of operation in its forward direction with the line X being positive with the line Y and assume that positive voltages are applied to the gate electrodes G1 and G2 of the devices S1 and S2 from the firing control circuit FC. Since the line X is positive with respect to line Y, controlled switch S1 will conduct current into the dotted end of the field winding L while device S2 will be reverse biased. As shown in curve $a$, a positive voltage will be developed across the field winding L, and, in curve $b$, a positive current will be supplied thereto of the magnitudes indicated in the respective curves. At a time $t_1$ the rapid reversal operation is instigated by the application of a turnoff pulse from the firing control circuit FC to the gate electrode G1 of the gate turnoff device S1. Devices such as thyristors having a turnoff characteristic may be turned off in a very short time, for example, within 5 microseconds from the application of the turnoff pulse thereto.

The capacitor C connected across the field winding L forms a parallel tuned resonant circuit with the inductance of the field winding L having a predetermined resonant frequency. As is well known, the resonant frequency of a parallel tuned circuit is equal to:

$$F = 1/2\pi \sqrt{LC}$$

where $L$ is the inductance of the field winding L and $C$ is the capacitance of the capacitor C. The period T at this frequency is equal to $2\pi\sqrt{LC}$. It is desired that the time for reversal be equal to one half of a period T/2 at the resonant frequency, that is, the time for reversal is equal to $\pi\sqrt{LC}$. Thus, the capacitor C is selected to have such a capacitance to provide the desired reversal time of T/2. The speed of reversal is limited only by (1) the peak insulation rating of the field winding L and (2) the holdoff peak voltage rating and the reverse peak voltage rating of the switches S1 and S2.

With the turning off of the controlled switch S1 the tuned circuit LC is excited into oscillation at its resonant frequency F. As can be seen from curve $a$ the voltage across the inductor L rapidly reverses, while, as shown in curve $b$, that current through the inductor begins to decrease toward zero. At a time $t_2$ the complete turnoff of the turnoff device S1 has been completed. It should be noted that when the switch S1 is completely opened at the time $t_2$ the reverse voltage is only a small fraction of the peak voltage which is reached at a later time $t_3$ which is the peak voltage that the device S1 must subsequently block. However, due to the fact that the complete turnoff is effected at the time $t_2$ prior to the reaching of the peak reverse voltage, the turnoff requirements of the turnoff devices S1 and S2 are greatly eased.

At the time $t_3$ the field voltage is at its maximum reverse value and the field current is at its zero value at the point of reversal to the negative direction. After the time $t_3$ the field voltage decreases and the field current increases in the reverse direction. At the time $t_4$ the resonant circuit LC will have gone through a half cycle of oscillation at its resonant frequency F. The half time period T/2, as indicated in FIG. 2 between the times $t_1$ and $t_4$, is equal to $\pi\sqrt{LC}$. At the time $t_4$, the field voltage will be at the initial value before the switch S1 opened the circuit and the field current will have completely reversed to a reverse value corresponding to the normal forward current value. At the time $t_4$, the field voltage will again try to reverse. However, in that the controlled switch S2 has been maintained in a conductive condition by the application of a positive voltage to the gate G2 thereof, the reverse current through the field winding L will be caught at this value and translated through the anode-cathode circuit of the device S2 to flow regeneratively into the capacitor C1, since at this time the polarity at the lines X and Y has not yet been reversed.

The reverse current will continue to flow into the capacitor C1 and the relatively slow followup reversal of the polarities at the lines X and Y may be instigated as for example at time $t_5$ and completed at a time $t_6$ by the operation of the low-speed feed reversal network FR. The time $t_5$ to $t_6$ defining the slow followup reversal time is much longer than the fast reversal time from $t_1$ to $t_4$ which is established to be one-half the time period T/2 at the resonant frequency F of the tuned circuit LC. with the field current in the reverse direction and the polarity at the line Y now being positive with the line X at the time $t_6$, current in the reverse direction can be maintained in steady-state for the desired time for motor operation in the reverse direction. The capacitor C1 and the resistor R1 insure that there is no interruption of field current or the introduction of transient current from the supply during the relatively slow reversal time of the low-speed reversal network FR.

After the time $t_6$ but prior to the next reversal of the current through the field winding L, the turnoff switching device S1 is supplied with a positive polarity voltage from the firing control circuit FC to place it in a conductive condition. The field current however continues to flow in the reverse direction through the switching device S2 until it is desired to reverse the direction of motor operation to the forward direction.

In order to reverse the direction of motor operation, the turnoff switch S2 is turned off by the application of a negative polarity voltage from the firing control circuit with the positive voltage being maintained on the gate of the device S1. The opening of the current path through the field winding L causes the resonant circuit LC to be excited into oscillation at its resonant frequency. As the current through the winding L resonantly reverses it is caught by the forward conduction of the switch S1 which clamps the field current now in the forward direction at the desired value at the end of one-half cycle of oscillation at the resonant frequency which is selected to be the desired time for the fast reversal of the field current. With the device S1 conducting and the current now flowing in the forward direction through the field winding L, the low-speed field reversal network FR, in response to an input F1 thereto from the firing control circuit FC, one-half in response to an input F1 thereto from the firing control circuit FC, instigates the slow followup reversal of the polarity at the lines X and Y, respectively, with the current through the field winding then being maintained in steady-state in the forward direction.

From the foregoing, it can thus be seen by the use of the rapid resonant reversal technique of the present invention that field reversal can be effected at a speed limited only by the peak insulation rating of the field winding L and the ratings of the turnoff switching devices utilized. Moreover, the power supply need not be of the type required to force the reversal of the field current as commonly employed in the prior art but can be of a standard design. Additionally, since the power supply is isolated from the high voltages generated at the field winding, it hence may be of a standard economical design.

I claim as my invention:

1. A system for rapidly reversing the direction of current through a load including inductance and operative with a power supply providing respective outputs of opposite polarities the combination of:

reversing means for reversing the polarity of said outputs within a first time period;

bidirectional switch means operatively connected between said power supply and said impedance element for translating current to said load in either direction in accordance with the respective polarity of said outputs;

capacitive means operatively connected across said load forming a resonant circuit with the inductance thereof and having a predetermined resonant frequency; and means for instigating the rapid reversal of current through said load in a second time period shorter than said first period by open circuiting said bidirectional switch means in the direction of current flow so that said resonant circuit resonates causing a reversal of the current which is then translated by said bidirectional switch means in the opposite direction to the previous direction of current flow when the current reaches a predetermined magnitude in said opposite direction, and for closing said bidirectional switch means in the direction previously open circuited at a time prior to the time of the next reversal of current is desired.

2. The combination of claim 1 wherein:

said capacitance means is so selected to provide said resonant frequency having a half period related to the time desired for reversing the current flow.

3. The combination of claim 2 wherein:

said time desired for reversing is substantially equal to the half period of said resonant frequency.

4. The combination of claim 1 wherein:

said load comprises the field winding of a DC motor, and said bidirectional switch means includes a first unidirectional switch for translating current in one direction and a second unidirectional switch for translating current in the other direction, each of said switches being operative to be open circuited when current is flowing therethrough.

5. The combination of claim 4 wherein:

said first and second unidirectional switches each comprise switching devices having a turnoff characteristic.

6. In a method for rapidly reversing the direction of current through a load including inductance comprising the steps of:

providing current from a source to said load in either direction;

open circuiting the current in the direction of flow;

establishing a resonant oscillation with said impedance element so that the current reverses to a predetermined value in a predetermined time;

translating the current in the reverse direction when it reaches said predetermined value back to the source;

reversing the polarity of the source to sustain the current flow in the reverse direction; and closing the previously opened circuit prior to the next reversal of current direction.

7. The method of claim 6 wherein:

said predetermined time is substantially less than the time required to reverse the current by reversing the polarity of the source.

8. The method of claim 7 wherein:

said resonant oscillation has a frequency having a half period substantially equal to said predetermined time period.